(12) United States Patent
Kanno et al.

(10) Patent No.: US 7,851,528 B2
(45) Date of Patent: Dec. 14, 2010

(54) FLAME-RETARDANT RESIN PROCESSED ARTICLE

(75) Inventors: Toshiyuki Kanno, Hino (JP); Yoshinobu Sugata, Hino (JP); Hironori Yanase, Hino (JP); Kiyotaka Shigehara, Fuchu (JP)

(73) Assignees: Fuji Electric Holdings Co., Ltd., Kawasaki-shi (JP); National University Corporation Tokyo University of Agriculture and Technology, Fuchu-shi (JP)

( * ) Notice: Subject to any disclaimer, the term of this patent is extended or adjusted under 35 U.S.C. 154(b) by 403 days.

(21) Appl. No.: 11/915,505

(22) PCT Filed: May 23, 2006

(86) PCT No.: PCT/JP2006/310228

§ 371 (c)(1),
(2), (4) Date: Nov. 26, 2007

(87) PCT Pub. No.: WO2006/126528

PCT Pub. Date: Nov. 30, 2006

(65) Prior Publication Data

US 2009/0105382 A1    Apr. 23, 2009

(30) Foreign Application Priority Data

May 24, 2005    (JP)    ............... 2005-150469

(51) Int. Cl.
*C08K 5/5313*    (2006.01)
*C08K 5/49*    (2006.01)

(52) U.S. Cl. ....................... 524/133; 524/115

(58) Field of Classification Search ............... 524/133
See application file for complete search history.

(56) References Cited

U.S. PATENT DOCUMENTS

2004/0110878 A1 *    6/2004    Knop et al. ............... 524/115

FOREIGN PATENT DOCUMENTS

| EP | 1 516 907 A1 | 3/2005 |
|---|---|---|
| EP | 1640411 A1 * | 3/2006 |
| JP | 5 331179 | 12/1993 |
| JP | 9 221572 | 8/1997 |
| JP | 2002 20394 | 1/2002 |
| JP | 2002 80633 | 3/2002 |
| JP | 2002 138096 | 5/2002 |
| JP | 2002 256136 | 9/2002 |
| JP | 2003 49036 | 2/2003 |
| JP | 2003049036 A * | 2/2003 |
| JP | 2004 18857 | 1/2004 |
| JP | 2004 250539 | 9/2004 |
| JP | 2004 315672 | 11/2004 |
| JP | 2006 89534 | 4/2006 |
| JP | 2006 137843 | 6/2006 |
| WO | 03 087230 | 10/2003 |
| WO | 2004 111121 | 12/2004 |
| WO | 2005 012415 | 2/2005 |
| WO | 2005 026251 | 3/2005 |
| WO | WO 2005/033192 A1 | 4/2005 |
| WO | 2006 088086 | 8/2006 |

OTHER PUBLICATIONS

Translation of JP2003049036, Hibino, Feb. 2003.*
U.S. Appl. No. 11/915,391, filed Nov. 26, 2007, Kanno, et al.

* cited by examiner

*Primary Examiner*—Ling-Siu Choi
*Assistant Examiner*—Hui Chin
(74) *Attorney, Agent, or Firm*—Oblon, Spivak, McClelland, Maier & Neustadt, L.L.P.

(57) ABSTRACT

A flame retardant resin treated article that excels in flame retardancy and is free from bleedout. A resin composition comprising a flame retarder of metal phosphinate represented by the general formula: (I) (in the formula, each of $R^1$ and $R^2$ is a $C_1$-$C_6$ alkyl or an aryl group having 12 or less carbon atoms; M is calcium, aluminum or zinc; and when M=aluminum, m=3, and otherwise m=2), a reactive organophosphorus flame retarder having an unsaturated group at its terminal and a resin wherein the total content of metal phosphinate and reactive organophosphorus flame retarder is in the range of 5 to 30 mass % is provided in molded form or coating form.

16 Claims, 2 Drawing Sheets

[Figure 1]
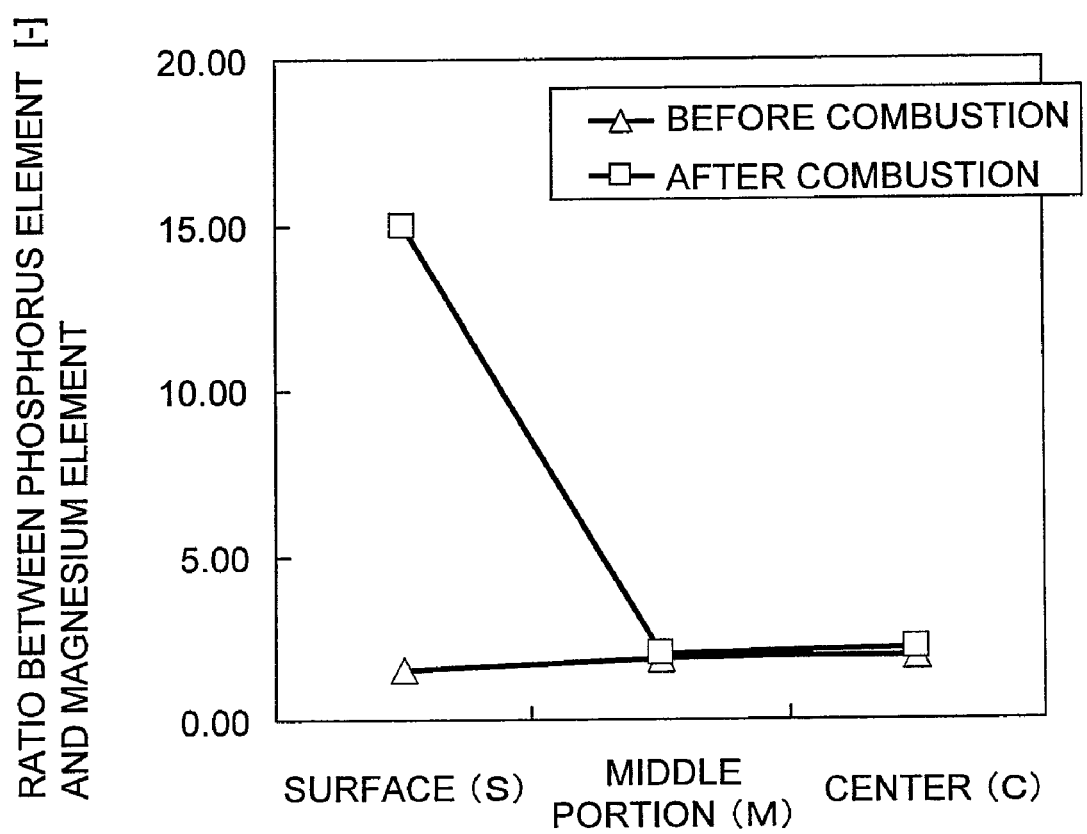

[Figure 2]
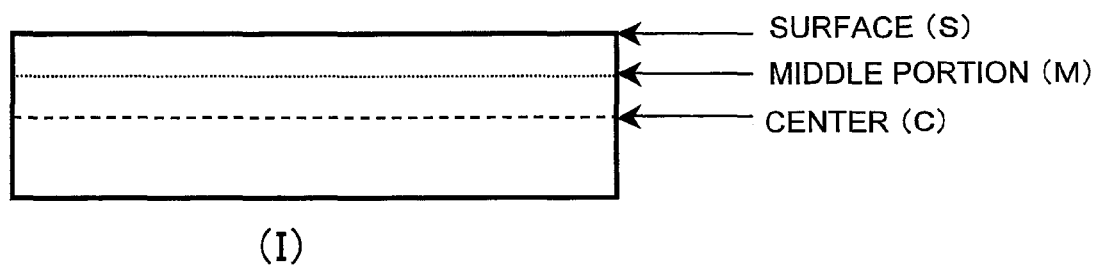
(I)
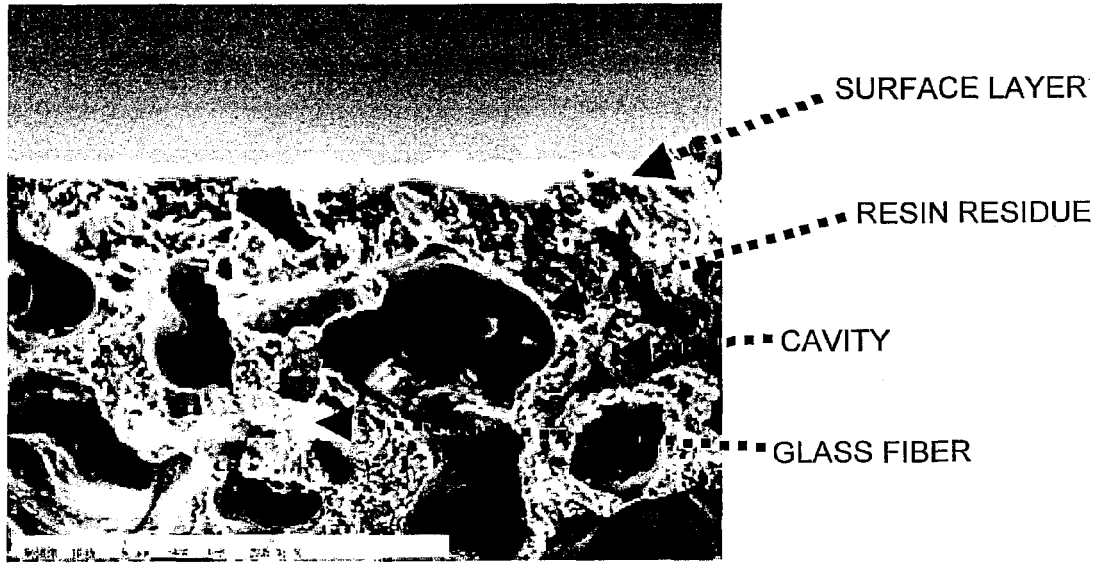
ACCELERATING VOLTAGE 10kV
MAGNIFICATION 500
(II)

FLAME-RETARDANT RESIN PROCESSED ARTICLE

TECHNICAL FIELD

The present invention relates to a flame-retardant resin processed article for use, for example, in electric components and electronic components as a resin molded article, a coating film or a sealing agent. More specifically, the present invention relates to a non-halogen-based flame retardant containing no halogen.

BACKGROUND ART

Thermoplastic resins such as polyester and polyamide, and thermosetting resins such as epoxy each have excellent moldability, mechanical strength, and electrical characteristics for a general-purpose resin and an engineering plastic, and thus have been used in various fields including the fields of electricity and electronics. In addition, resin materials obtained by processing and molding those resins are required to be flame retardant in terms of safety for the purpose of preventing a fire at a high temperature. For example, specifications such as UL94 have been provided as flame retardance grades.

It is generally known that a halogen substance is effective in making such a resin material flame-retardant. Flame retardance is imparted to the resin material by adding a halogen-based flame retardant to the resin. The mechanism of imparting flame retardance to the resin by the halogen-based flame retardant is said to be as follows. That is, a halogenated radical is produced mainly by heat decomposition, and the produced halogenated radical captures an organic radical being a combustion source to stop the chain reaction of combustion, whereby high flame retardance is expressed.

However, a flame retardant containing a large amount of halogen compound may generate dioxin and the like depending on combustion conditions, so there has been a growing demand for reducing the amount of halogen in recent years from the viewpoint of reducing a load to the environment. Therefore, various non-halogen-based flame retardants each containing no halogen-based compound have been examined.

Inorganic flame retardants such as a metal hydrate and red phosphorus, triazine-based flame retardants derived from carbamide, organophosphorus-based flame retardants such as a phosphoric ester, and the like have been examined as such non-halogen-based flame retardants. In the case of a metal hydrate such as aluminum hydroxide or magnesium hydroxide, which does not have a very high flame retardance imparting effect, the metal hydrate must be blended with a large amount of resin. Therefore, the moldability of a resin is apt to deteriorate and the mechanical strength of a molded article to be obtained or the like is apt to reduce, thereby causing a problem that applications of a usable resin processed article or the like are limited. In addition, a molded article of a triazine-based flame retardant is apt to have gloss, so the design of the molded article is limited. The gloss of the molded article can be frosted by being blended with a delustering agent such as talc or calcium carbonate, however, there remains a problem in that toughness and flame retardance of the molded article deteriorate. In addition, red phosphorus is apt to inhibit electrical characteristics owing to insufficient dispersion, generate a dangerous gas, reduce moldability, and cause bleeding, though it has a high flame retardance effect.

For example, Patent Documents 1 and 2 below each disclose that each of red phosphorus and aluminum hydroxide is used in combination with silica gel having an oil absorption of 70 to 250 ml/100 g in order that the flame-retarding effect of each of red phosphorus and aluminum hydroxide may be improved.

On the other hand, for example, Patent Document 3 below discloses that a piperazine salt of an acidic phosphoric ester having a phosphorinane structure or alkylenediamine salt having 1 to 6 carbon atoms is used as a flame retardant being an organophosphorus-based flame retardant such as a phosphoric ester.

In addition, Patent Document 4 below discloses a flame retardant for a resin mainly composed of a salt composed of an aromatic phosphoric ester such as monophenyl phosphate or monotolyl phosphate and an aliphatic amine such as piperazine.

Further, Patent Document 5 below discloses that a phosphorus-containing phenol compound is used as a flame retardant for providing a flame-retardant epoxy resin which exerts an excellent flame retardance effect as a halogen-free flame-retardant prescription and which is excellent in physical properties of a molded article such as heat resistance and water resistance and in adhesiveness in an electrical laminated plate application.

Still further, Patent Document 6 below discloses an organic cyclic phosphorus compound having a bifunctional hydroxyl group particularly useful as a stabilizer for a polymer compound or as a flame retardant.

Patent Document 1: JP 2002-256136 A
Patent Document 2: JP 2003-49036 A
Patent Document 3: JP 2002-20394 A
Patent Document 4: JP 2002-80633 A
Patent Document 5: JP 2002-138096 A
Patent Document 6: JP 5-331179 A

DISCLOSURE OF THE INVENTION

Problems to be Solved by the Invention

As disclosed in each of Patent Documents 1 and 2 above, the combined use of red phosphorus and silica gel can improve the flame retardance of red phosphorus. However, an inorganic phosphorus-based flame retardant such as red phosphorus is hard to handle, and a resin composition containing the inorganic phosphorus-based flame retardant is poor in moldability and apt to cause a bleeding phenomenon.

On the other hand, as disclosed in each of Patent Documents 3 to 6 above, various investigations have been conducted on organophosphorus-based flame retardants, and a variety of organophosphorus-based flame retardants are currently available. However, those organophosphorus-based flame retardants are organic compounds, so each of them is apt to be decomposed owing to the actions of various components that coexist in a resin composition, and cannot sufficiently exert its flame retardance in some cases. In addition, a flame retardant cannot sufficiently exert its effect unless the flame retardant is uniformly dispersed in a resin, so the addition amount of the flame retardant increases depending on, for example, a resin to be used.

Therefore, an object of the present invention is to provide a flame-retardant resin processed article which: uses an organophosphorus-based flame retardant as a non-halogen-based flame retardant; is excellent in flame retardance; and does not cause the bleed-out of the flame retardant or the like.

Means for Solving the Problems

To achieve the above object, a flame-retardant resin processed article of the present invention is characterized by including a resin composition which contains a flame retardant that contains a metal phosphinate represented by the following general formula (I), a reactive organophosphorus flame retardant having a terminal unsaturated group, and a resin, the resin composition being molded into a certain shape or formed into a coating film, in which the total content of the metal phosphinate and the reactive organophosphorus flame retardant in the resin composition is from 5 to 30 mass %:

[Chem 1]

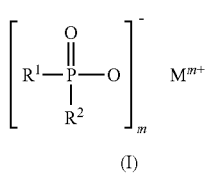

(I)

where $R^1$ and $R^2$ each independently represent an alkyl group having 1 to 6 carbon atoms or an aryl group having 12 or less carbon atoms; where M represents calcium, aluminum or zinc; and where m is 3, when M representing aluminum, and otherwise m is 2.

The uniform inclusion of the compound represented by the above formula (I) in the resin provides a thermally and chemically stable state. In addition, because the compound is apt to be vaporized and decomposed to form phosphine oxide ions and metal ions at a temperature of about 300 to 400° C., the compound is decomposed to form phosphine oxide ions and metal ions upon combustion and the phosphine oxide ions migrate to the surface of the resin processed article and the like. Then, accompanied by decomposition of the resin upon combustion, a soot component is produced and deposited on the surface of the resin processed article, leading to incorporation of metal ions by the soot to form reinforced char (heat decomposition residue) having a high blocking effect against heat and oxygen. On a surface layer of the char, a phosphorus compound deposits to form a diffusion layer (flame retardant layer) having a high flame retarding effect by the phosphorus compound, so high flame retardance can be obtained. In addition, use of a reactive organophosphorus flame retardant having a terminal unsaturated group in combination results in synergism, so even a small amount of such compound can exhibit a high flame retardance. Further, upon heating or irradiation of radiation, the reactive organophosphorus flame retardant binds to the resin, so the resin is crosslinked to form a three-dimensional network structure, thus providing a resin processed article excellent in all of chemical stability, heat resistance, mechanical strength, electrical characteristics, dimensional stability, flame retardance, and moldability, particularly with heat resistance and mechanical strength being improved. Further, thin-wall molding becomes possible. The flame retardant component is stably present in the resin, so bleed out of the flame retardant component hardly occurs; when the total content of the flame retardant in the entirety of flame retardant resin processed article is as small as, 5 to 30 mass %, the flame retardance can be imparted to the resin for a long period of time.

In the above-mentioned flame-retardant resin processed article, the resin composition preferably contains two or more kinds of the reactive flame retardants at least one kind of which is polyfunctional.

According to this aspect, the combined use of flame retardants different from each other in reactivity can control a reaction rate necessary for the crosslinking, so the contraction or the like of the resin due to the abrupt advancement of a crosslinking reaction can be prevented. In addition, the incorporation of a polyfunctional flame retardant results in the formation of a uniform three-dimensional network structure by the organophosphorus compound, so heat resistance and flame retardance are improved and more stable resin physical properties are obtained.

In addition, in the above flame-retardant resin processed article, the resin composition preferably contains 5 mass % or more of the metal phosphinate and 0.5 mass % or more of the reactive organophosphorus flame retardant.

In addition, in the above-mentioned flame-retardant resin processed article, the resin composition preferably further contains, except the aforementioned reactive flame retardant, a flame retardant being a cyclic nitrogen-containing compound having at least one unsaturated group at a terminal of the compound.

According to this aspect, even with the cyclic nitrogen-containing compound having at least one unsaturated group at an end thereof, bonding between the flame retardant and the resin causes the resin to crosslink to provide a three-dimensional network structure. Therefore, while the entire cost of the flame retardants can be reduced owing to the combined use of the flame retardants, a resin molded article, from which a resin processed article obtained is excellent in all of chemical stability, heat resistance, mechanical characteristics, electrical characteristics, dimensional stability, flame retardance, and moldability, can be obtained. In addition, the incorporation of nitrogen additionally improves compatibility with the resin particularly in the case where a polyamide-based resin is used as the resin.

In addition, in the flame-retardant resin processed article, it is preferable that the resin composition further contain hydrophilic silica powder having an average particle diameter of 15 μm or less. In particular, the hydrophilic silica powder is preferably one having a porous structure having a pore volume of 1.8 ml/g or less and a pH of 4 to 7, and preferably has an oil absorption of 50 ml/100 g or more in accordance with JIS K5101. It is preferable that the resin composition contains 2 to 12 mass % of the hydrophilic silica powder.

According to this mode, the hydrophilic silica powder adsorbs the flame retardant and at the same time is compatible with the resin, so the flame retardant component can be prevented from bleed-out. In addition, there occurs no deterioration of the performance due to decomposition or the like of the metal phosphinate of the formula (I) above and the reactive organophosphorus flame retardant which are used in combination, so excellent flame retardance can be obtained.

Further, in the flame-retardant resin processed article, the resin composition preferably further contains a crosslinking agent which is a polyfunctional monomer or oligomer having an unsaturated bond at a terminal end of its main skeleton.

According to this aspect as well, bonding between the crosslinking agent and the resin causes the resin to crosslink to provide a three-dimensional network structure. Therefore, a resin molded article, from which a resin processed article obtained is excellent in all of chemical stability, heat resistance, mechanical characteristics, electrical characteristics, dimensional stability, flame retardance, and moldability, can be obtained.

Further, in the flame-retardant resin processed article, the flame-retardant resin processed article preferably further contains 1 to 45 mass % of an inorganic filler with respect to the entirety of the flame-retardant resin processed article. In particular, the flame-retardant resin processed article preferably contains 1 to 8 mass % of a laminar clay as the inorganic filler with respect to the entirety of the flame-retardant resin processed article, the laminar clay having silicate layers laminated. According to this aspect, a resin processed article, the contraction and decomposition of which due to crosslinking are suppressed and which is excellent in dimensional stability, can be obtained. In addition, when a laminar clay obtained by laminating silicate layers is incorporated as the inorganic filler, the laminar clay is dispersed into the resin in a nano order to form a hybrid structure with the resin. As a result, the heat resistance, mechanical strength, and the like of the flame-retardant resin processed article to be obtained are improved.

Further, in the flame-retardant resin processed article, the flame-retardant resin processed article preferably further contains 5 to 50 mass % of reinforced fibers with respect to the entirety of the flame-retardant resin processed article. According to this aspect, the incorporation of the reinforced fibers can improve the mechanical strength of the resin processed article such as tensile strength, compressive strength, bending strength, or impact strength. Further, reductions in physical properties due to moisture and temperature can be prevented.

Further, in the flame-retardant resin processed article, the flame-retardant resin processed article is preferably obtained through a reaction between the resin and the reactive flame retardant by irradiation with an electron beam or γ ray at a dose of 10 kGy or more. According to this aspect, after having been solidified by molding or the like, the resin can be crosslinked by a radiation, so that a resin processed article can be produced with high productivity. In addition, a dose in the above-mentioned range can prevent nonuniform formation of a three-dimensional network structure due to an insufficient dose and can prevent bleed-out due to the remaining of an unreacted crosslinking agent. In particular, an irradiation dose of 10 to 45 kGy can prevent deformation, contraction, and the like due to the internal strain of the resin processed article resulting from an oxidation decomposition product generated by an excessive dose.

Further, in the flame-retardant resin processed article, the flame-retardant resin processed article is also preferably obtained through a reaction between the resin and the reactive flame retardant at a temperature higher than the temperature at which the resin composition is molded by 5° C. or higher. According to this aspect, a radiation irradiator or the like is not needed, and, in particular, it can be suitable in case where a resin composition containing a thermosetting resin is used.

Further, in the flame-retardant resin processed article, the flame-retardant resin processed article is preferably one selected from a molded article, a coating film, and a sealing compound. As described above, the flame-retardant resin processed article of the present invention has excellent flame retardance and can be prevented from bleed-out. Therefore, the flame-retardant resin processed article not only can be used as a typical resin molded article, but also can be formed into a coating film as a coating agent or the like; or can be suitably used as a sealing compound for a semiconductor, a liquid crystal material, or the like.

Further, in the flame-retardant resin processed article, the flame-retardant resin processed article is preferably used as an electrical component or an electronic component. As described above, the flame-retardant resin processed article of the present invention is excellent in all of heat resistance, mechanical characteristics, electrical characteristics, dimensional stability, flame retardance, and moldability, so it can be particularly suitably used as an electrical component or an electronic component in which the above-mentioned physical properties are particularly stringently demanded.

EFFECT OF THE INVENTION

According to the present invention, there can be provided a flame-retardant resin processed article excellent in flame retardance while being free from bleed-out or the like.

BRIEF DESCRIPTION OF THE DRAWINGS

FIG. 1 is a graph showing the phosphorus concentration distributions of a resin processed article of the present invention before and after the combustion of the resin processed article.

FIG. 2(I) is a sectional view of the UL 94 combustion test piece of the resin processed article of the present invention after the combustion of the resin processed article, and FIG. 2(II) is an enlarged SEM image of the section of the test piece after a UL 94V combustion test near the surface (S) of the view (I).

BEST MODE FOR CARRYING OUT THE INVENTION

A flame-retardant resin processed article of the present invention is obtained by molding a resin composition containing a metal phosphinate flame retardant represented by the general formula (I) below, a reactive organophosphorus flame retardant having a terminal unsaturated group, and a resin into a certain shape, or by forming the resin composition into a coating film, in which a total content of the metal phosphinate and the reactive organophosphorus flame retardant in the resin composition is from 5 to 30 mass %:

[Chem 2]

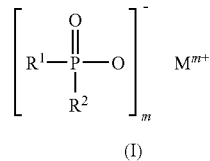

(I)

where $R^1$ and $R^2$ each independently represent an alkyl group having 1 to 6 carbon atoms or an aryl group having 12 or less carbon atoms; where M represents calcium, aluminum or zinc; and where m is 3, when M representing aluminum, and otherwise m is 2.

As a resin capable of being used in the present invention, each of a thermoplastic resin and a thermosetting resin can be used without any particular limitation.

Examples of the thermoplastic resin include: a polyamide-based resin; a polyester-based resin such as a polybutylene terephthalate resin or polyethylene terephthalate; a polyacrylic resin; a polyimide-based resin; a polycarbonate resin; a polyurethane-based resin; a polystyrene-based resin such as polystyrene, an acrylonitrile-styrene copolymer, or an acrylonitrile-butadiene-styrene copolymer; a polyacetal-based resin; a polyolefin-based resin; a polyphenylene oxide resin; a polyphenylene sulfide resin; and a polybutadiene resin. Of those, in terms of mechanical characteristics, heat resistance, and the like, it is preferable to use a polyamide-based resin, a polybutylene terephthalate resin, a polyethylene terephthalate resin, a polycarbonate resin, a polyacrylic resin, a polyacetal-based resin, or a polyphenylene oxide resin.

Examples of the thermosetting resin include an epoxy resin, a urethane resin, an unsaturated polyester resin, a phenol resin, a urea resin, a melamine resin, an alkyd resin, and a silicone resin. Of those, in terms of mechanical characteristics, heat resistance, and the like, an epoxy resin, a phenol resin, an unsaturated polyester resin, or a urea resin is preferably used.

The metal phosphinate flame retardant that can be used in the present invention is a compound represented by the formula (I) above.

Because the compound is vaporized at a temperature of about 300 to 400° C. and is apt to be decomposed to form phosphine oxide ions and metal ions, the compound is apt to be decomposed to form phosphine oxide ions and metal ions upon combustion and the phosphine oxide ions are apt to migrate on the surface of the article.

FIG. 1 shows a ratio between a phosphorus element and a magnesium element of the range from the surface layer to the center portion of the resin processed article before the combustion of the resin processed article (phosphorus is a flame retardant constituent, and magnesium is a constituent of talc uniformly dispersed in the molded article) and the ratio after a combustion test under test conditions in conformity with a UL 94V combustion test, in which a resin processed article be molded out of a resin composition containing the metal phosphinate and subjected to quantitative analysis for the phosphorus and magnesium elements with an energy-dispersive X-ray analyzer (manufactured by EDAX) at an accelerating voltage of 10 kV and a magnification of 50. In addition, FIG. 2(I) shows a sectional view of the surface of a resin molded article molded out of a resin composition using aluminum phosphinic acid as a the metal phosphinate after a combustion test under test conditions in conformity with the UL 94V combustion test, and FIG. 2(II) shows an SEM image of a section near a surface (S) observed with an electron-beam three-dimensional roughness analyzer (manufactured by ELIONIX CO., LTD: ERA-8800) at an accelerating voltage of 10 kV and a magnification of 500.

As is apparent from the test results of FIGS. 1 and 2, at the time of the combustion of the resin processed article containing the metal phosphinate, phosphine oxide ions are selectively deposited on the surface layer portion, which forms char (thermal decomposition residue) having a diffusion layer (flame retardant layer) due to phosphorus compound with a very high blocking effect against heat and oxygen. In addition, the metal ions formed as a result of decomposition upon combustion makes the char tougher, thus the resin processed article exhibits a high flame retardance.

Further, in the case where the metal phosphinate represented by the above formula (I) has an excessively large molecular weight, the compound is hardly stacked in a resin, and may be hardly adsorbed by a hydrophilic silica powder to be described later, so the bleed-out is apt to occur, so $R^1$ and/or $R^2$ in the formula (I) above is preferably one selected from methyl, ethyl, n-propyl, isopropyl, n-butyl, tert-butyl, n-pentyl, phenyl, and benzyl, with methyl and ethyl being more preferable.

Specific examples of the metal phosphinate of the formula (I) above include compounds of (I-1) to (I-30) shown below.

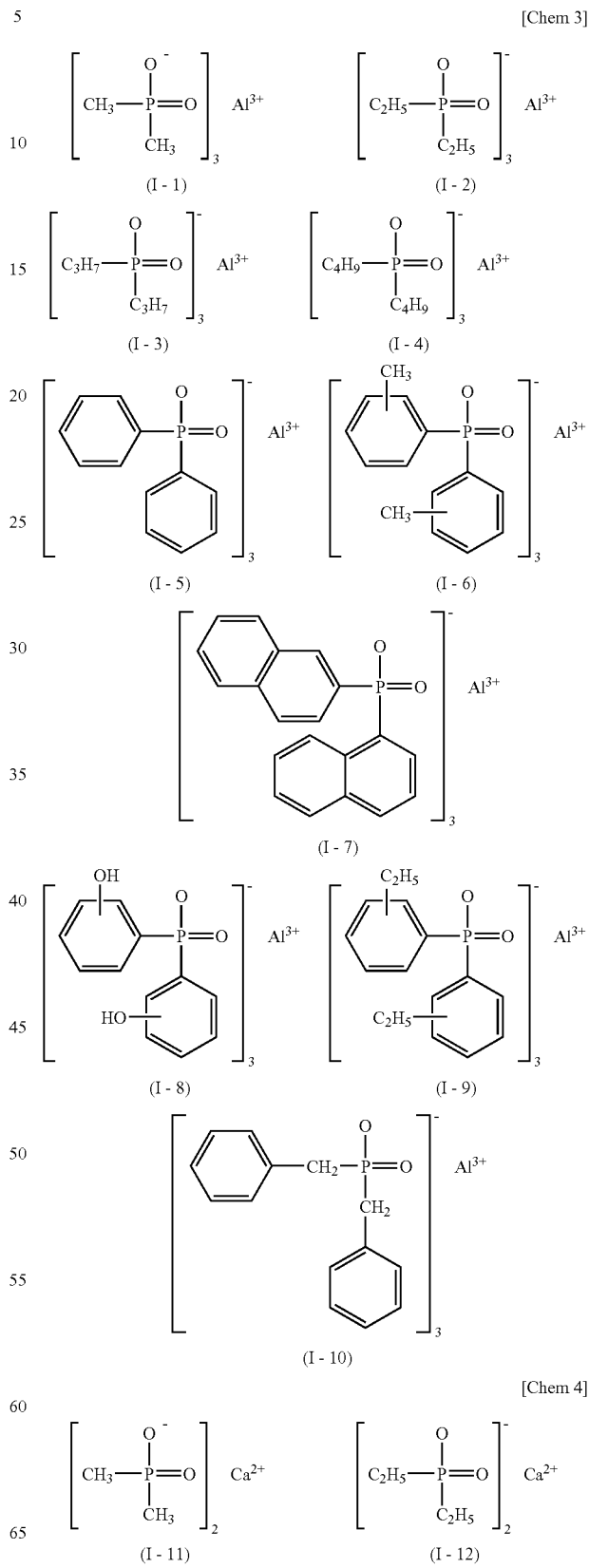

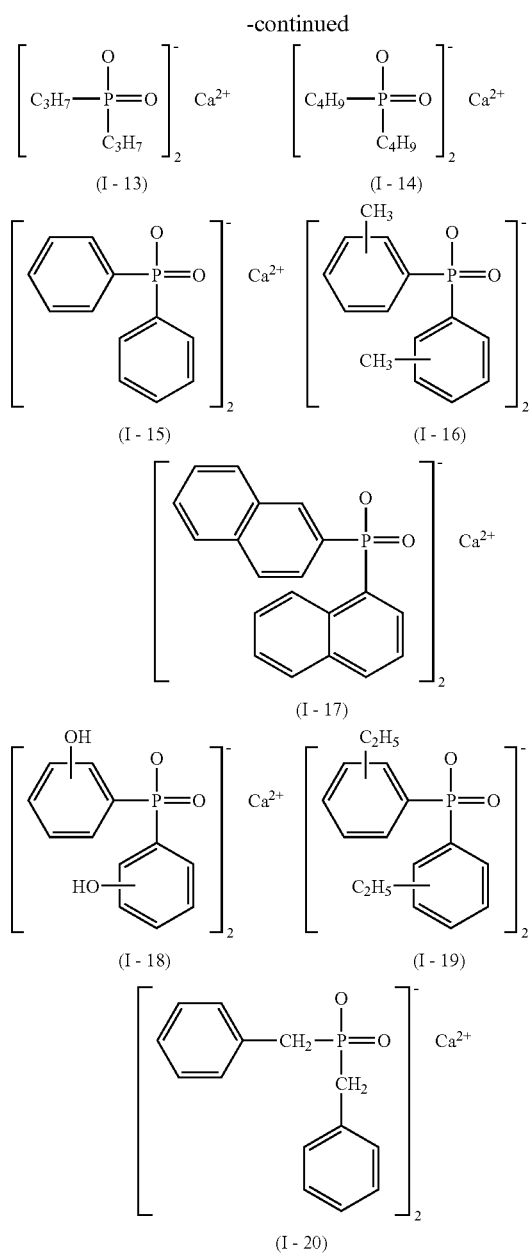
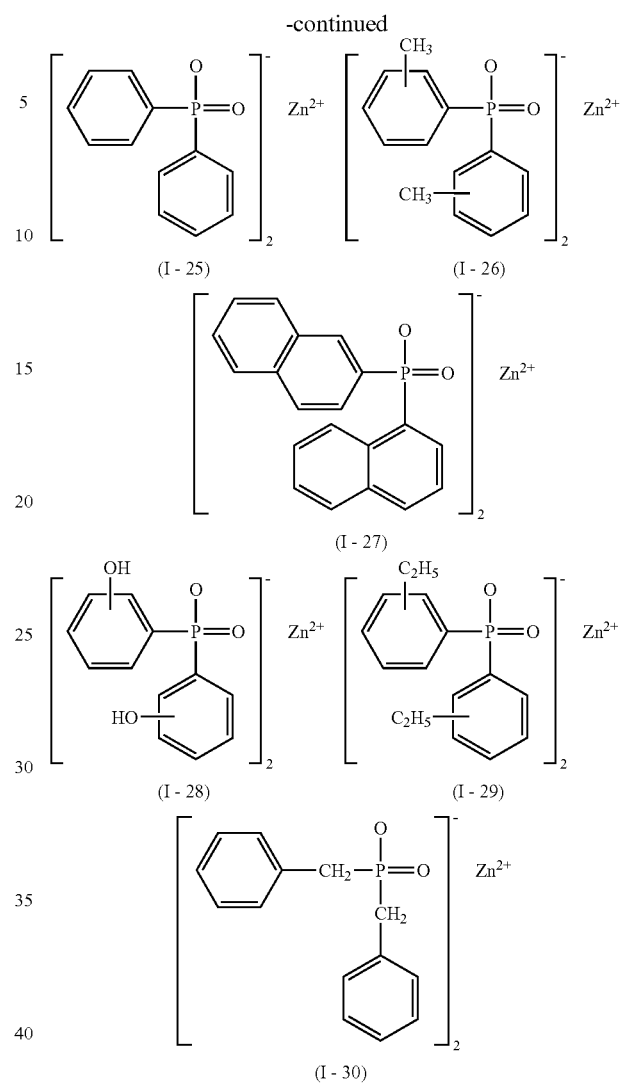
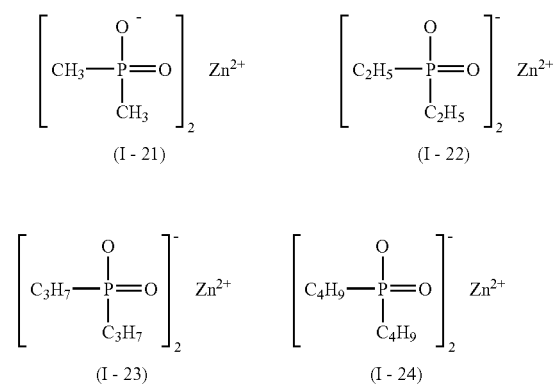

In addition, the content of the metal phosphinate in the resin composition is preferably 5 mass % or more, or more preferably 5 to 12 mass %. When the content of the metal phosphinate is less than 5 mass %, sufficient flame retardance cannot be obtained in some cases.

It should be noted that a commercially available compound may be used as such metal phosphinate. For example, a "OP-1230" (trade name, manufactured by Clariant Corporation) can be used.

Further, the reactive organophosphorus flame retardant that can be used in the present invention is preferably an organophosphorus compound having an unsaturated group as a terminal group in its molecular structure, or is particularly preferably an organophosphorus compound having at least an allyl group as a terminal group in its molecular structure. An organophosphorus compound having an allyl group as a terminal group in its molecular structure is bonded to the resin by heating or radiation to crosslink the resin so that the resin has a three-dimensional network structure. As a result, the mechanical, thermal, and electrical physical properties of a resin processed article containing the compound can be improved. In addition, the flame retardant is bonded to the resin to be stably present in the resin, so the bleed-out of the flame retardant hardly occurs. In addition, the combined use of the organophosphorus compound with the metal phosphinate represented by the above formula (I) can impart high flame retardance to the resin processed article by virtue of a synergistic effect of the compounds even when the addition amount of the flame retardants is small.

Examples of the reactive organophosphorus flame retardant as an organophosphorus compound having an allyl group in its molecular structure include compounds shown in the following formulae (II-1) to (II-22). Of those, a flame retardant having, in its molecular structure, three or more allyl groups and one or more aromatic hydrocarbons each having 20 or less carbon atoms is suitable.

[Chem 6]

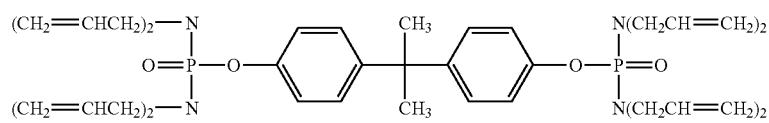
(II-1)

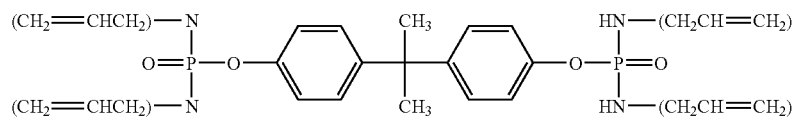
(II-2)

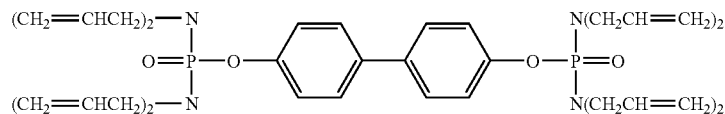
(II-3)

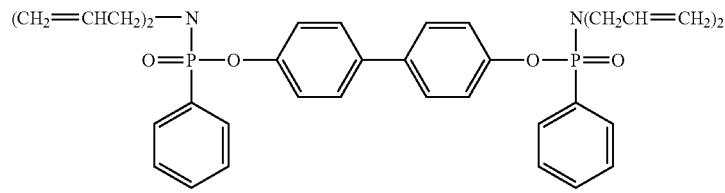
(II-4)

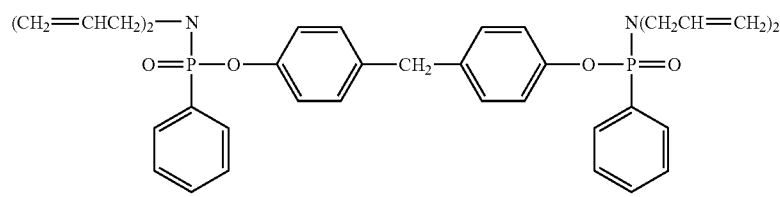
(II-5)

[Chem 7]

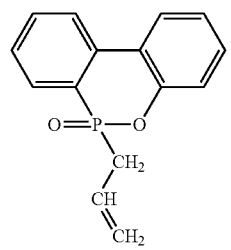
(II-6)

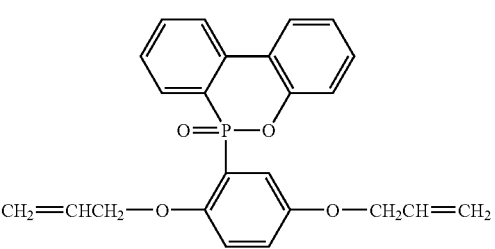
(II-7)

-continued
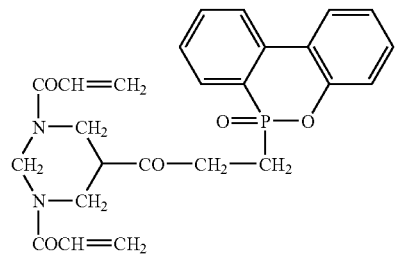
(II-8)
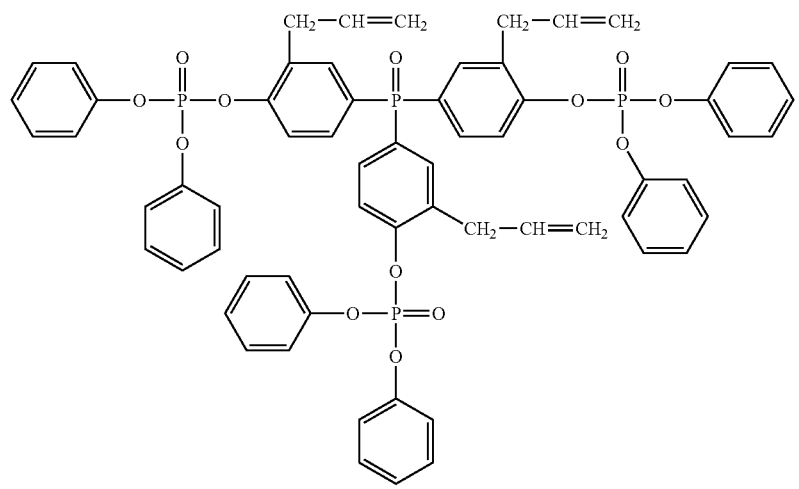
(II-9)
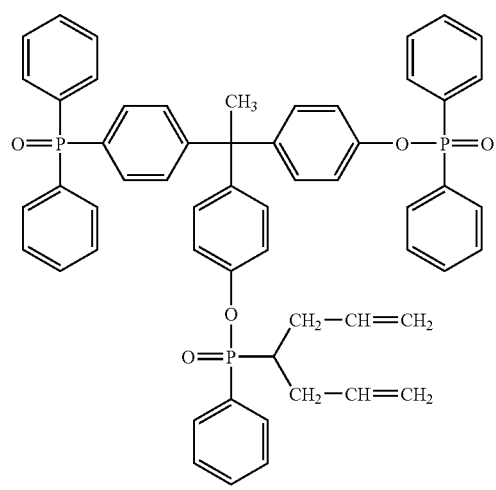
(II-10)
[Chem 8]
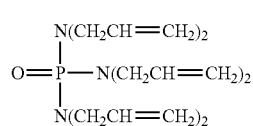
(II-11)
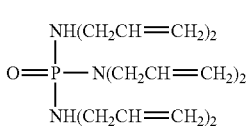
(II-12)

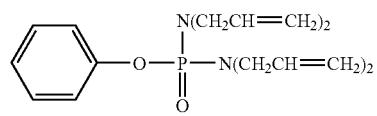
(II-13)
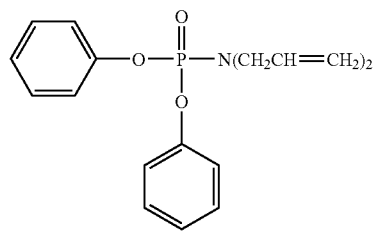
(II-14)
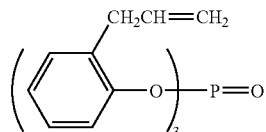
(II-15)
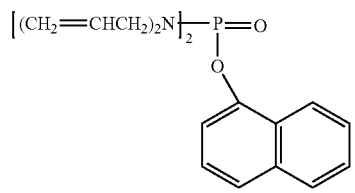
(II-16)
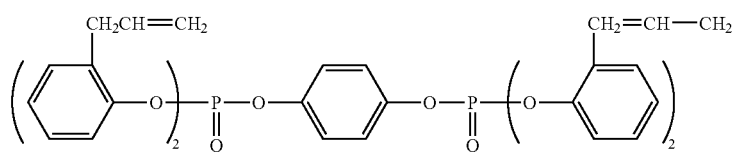
(II-17)
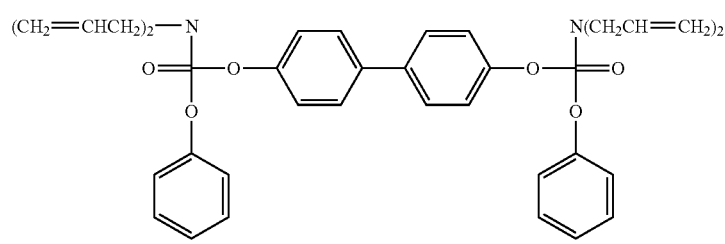
(II-18)
[Chem 9]
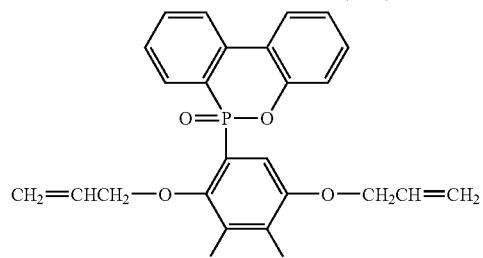
(II-19)
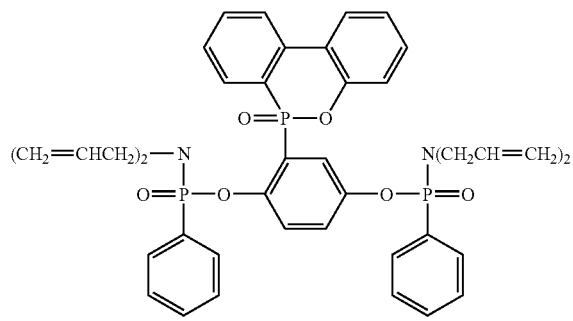
(II-20)
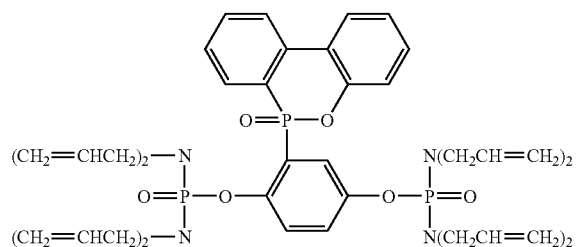
(II-21)
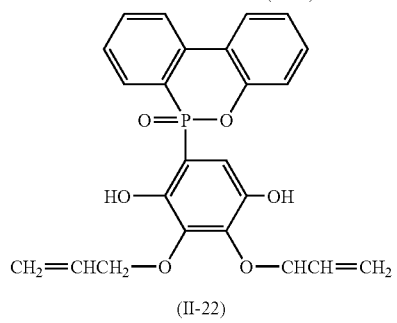
(II-22)

Of the above compounds, for example, Compound (II-1) can be obtained by: adding phosphorus oxychloride to dimethyl acetamide (DMAc); dropping, to the solution, a solution prepared by dissolving 2,2'-bis(4-hydroxyphenyl) propane and triethylamine in DMAC to cause the solutions to react with each other; and subjecting the mixed liquid of the resultant and diallylamine to a reaction.

In addition, Compound (II-9) shown above can be obtained by: adding dimethylformamide (DMF) to [tris(3-allyl-4-hydroxyphenyl)phosphineoxide]; and dropping, to the solution, a solution prepared by dissolving diphenylphosphoric chloride in DMF to cause the solutions to react with each other.

In addition, Compound (II-10) shown above can be obtained by: dropping a solution prepared by dissolving diphenylphosphonic monochloride in DMF to a solution prepared by dissolving 1,1,1-tris(4-hydroxyphenyl)ethane and triethylamine in distilled chloroform; and dropping a solution prepared by dissolving phenylphosphonic mono(N,N-diallyl) amide monochloride in DMF to the resultant to cause the solution and the resultant to react with each other.

In addition, Compound (II-20) shown above can be obtained by dropping, to dichlorophenylphosphine, a solution prepared by dissolving 10-(2,5-dihydroxyphenyl)-9-oxo-10-phospho-9,10-dihydrophenanthrene-10-one and triethylamine in tetrahydrofuran to cause dichlorophenylphosphine and the solution to react with each other.

It should be noted that other compounds can be synthesized by methods similar to those described above or the method described in JP 2004-315672 A.

In addition, the content of the reactive organophosphorus flame retardant in the flame-retardant resin composition is preferably 0.5 mass % or more, more preferably 0.5 to 3 mass %. When the content of the reactive organophosphorus flame retardant is less than 0.5 mass %, a degree of crosslinking in the resin is insufficient, so the mechanical, thermal, and electrical physical properties of a resin processed article to be obtained are apt to be insufficient in some cases.

In addition, the total content of the metal phosphinate represented by the above formula (I) and the reactive organophosphorus flame retardant in the flame-retardant resin composition is 5 to 30 mass %, preferably 10 to 22 mass %, more preferably 14 to 18 mass %. If the content of the flame retardant is less than 5 mass %, the obtained resin processed article has undesirable mechanical properties, thermal properties, and electrical properties, while a sufficient flame retardance can not be obtained. On the other hand, a content in excess of 30 mass % is not preferable because the flame retardant component may bleed out, or an unreacted monomer or decomposed gas of the reactive organophosphorus flame retardant may be produced, while the mechanical characteristics of the resin processed article reduce in some cases.

In the present invention, out of the above reactive organophosphorus flame retardants, two or more kinds of flame retardants different from each other in reactivity, that is, two or more kinds of organophosphorus compounds different from each other in number of the above functional groups in one molecule are preferably used in combination. The combined use can control a reaction rate needed for the crosslinking, so the contraction of the resin composition due to the abrupt progress of a crosslinking reaction can be prevented.

In addition, the resin composition preferably contains at least one kind of a polyfunctional reactive flame retardant. In this case, a uniform three-dimensional network structure is formed by the above organophosphorus compound.

In addition, in the present invention, the resin composition more preferably contains 0.5 to 10 parts by mass of a cyclic nitrogen-containing compound having at least one terminal unsaturated group as a flame retardant having reactivity except the above reactive organophosphorus flame retardant with respect to 1 part by mass of the reactive organophosphorus flame retardant.

Specific examples of the group having an unsaturated group at the above-mentioned end include a diacrylate, a dimethacrylate, a diallylate, a triacrylate, a trimethacrylate, a triallylate, a tetraacrylate, a tetramethacrylate, and a tetraallylate. However, of those, an acrylate such as a diacrylate, a triacrylate, or a tetraacrylate is more preferable in terms of reactivity. Examples of the cyclic nitrogen-containing compound include an isocyanuric ring and a cyanuric ring.

Specific examples of the cyclic nitrogen-containing compound having at least one unsaturated group at the above-mentioned end include derivatives of the above-mentioned cyanuric acid or isocyanuric acid, and for example, polyfunctional monomer or oligomer such as isocyanuric acid EO-modified diacrylate, isocyanuric acid EO-modified triacrylate, and triallylisocyanurate can be exemplified.

In addition, the flame-retardant resin processed article according to the present invention may contain a crosslinking agent which has no flame retardance but is reactive with the above-mentioned resin. A polyfunctional monomer or oligomer having an unsaturated group at a terminal of its main skeleton can be used as such crosslinking agent. It should be noted that the term "crosslinking agent which has no flame retardance but is reactive with the above-mentioned resin" as used in the present invention refers to a crosslinking agent which has crosslinking property (reactivity) but which itself has no flame retardance. The term excludes a reactive flame retardant having crosslinking property and flame retardance simultaneously like the above-mentioned "cyclic nitrogen-containing compound having at least one unsaturated group at a terminal of the compound".

Examples of such a crosslinking agent include bifunctional to tetrafunctional compounds represented by the following general formulae (a) to (c). Here, M represents a main skeleton, $R^{10}$ to $R^{13}$ each represent a functional group having a terminal unsaturated group, (a) represents a bifunctional compound, (b) represents a trifunctional compound, and (c) represents a tetrafunctional compound.

[Chem 10]

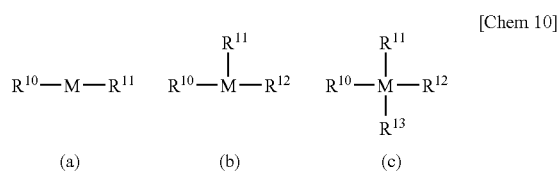

Specific examples thereof include structures represented by the following general formulae in each of which the main skeleton M is an aliphatic alkyl such as a glycerin derivative or a pentaerythritol derivative, an aromatic ring such as trimellitic acid, pyromellitic acid, tetrahydrofuran, or trimethylene trioxane, or bisphenol.

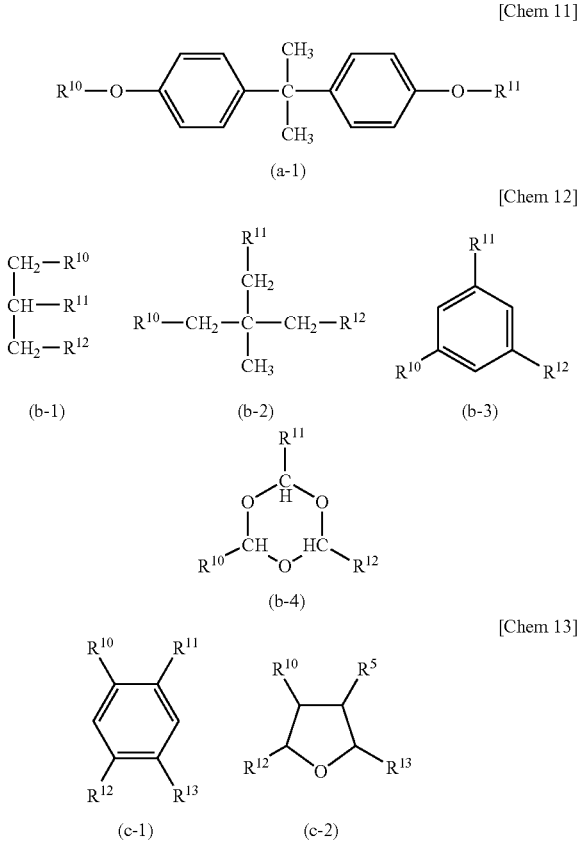

Specific examples of the above-mentioned crosslinking agent include bifunctional monomers or oligomers such as diacrylates including bisphenol F-EO-modified diacrylate, bisphenol A-EO-modified diacrylate, tripropylene glycol diacrylate, polypropylene glycol diacrylate, polyethylene glycol diacrylate, and pentaerythritol diacrylate monostearate, and dimethacrylates and diallylates thereof.

Examples of trifunctional monomers or oligomers include triacrylates such as pentaerythritol triacrylate, trimethylolpropane triacrylate, trimethylolpropane PO-modified triacrylate, and trimethylolpropane EO-modified triacrylate, and trimethacrylates and triallylates thereof.

Examples of tetrafunctional monomers or oligomers include ditrimethylolpropane tetraacrylate and pentaerythritol tetraacrylate.

The crosslinking agent is obtained by causing one kind selected from allyl bromide, allyl alcohol, allylamine, methallyl bromide, methallyl alcohol, and methallylamine as a functional group having an unsaturated group at an end thereof to react with one kind selected from trimellitic acid, pyromellitic acid, tetrahydrofuran tetracarboxylic acid, 1,3,5-trihydroxybenzene, glycerin, pentaerythritol, and 2,4,6-tris(chloromethyl)-1,3,5-trioxane as the main skeleton M.

The content of the crosslinking agent is preferably 0.5 to 10 parts by mass with respect to 1 part by mass of the above-mentioned reactive flame retardant.

In addition, the resin composition used in the present invention may contain, for example, other than the above-mentioned resins and flame retardants, an inorganic filler, a reinforced fiber, or any one of various additives.

The incorporation of inorganic filler can increase the mechanical strength and dimension stability of the resin processed article. The inorganic filler can serve as a substrate on which the flame retardant is adsorbed, so the flame retardant can be uniformly dispersed. In particular, hydrophilic silica powder having an average particle diameter of 15 μm or less is preferable. The hydrophilic silica powder is chemically stable, harmless and environmentally friendly. In addition, the hydrophilic silica powder is unlikely to decompose and deteriorate the flame retardant component in the resin composition, so the flame retardance effect of the resin composition is unlikely to be decreased. If the average particle diameter of the hydrophilic silica powder is 15 μm or less, dispersion of the hydrophilic silica powder in the resin can be made uniform. In this case, the flame retardant can be uniformly dispersed in the resin while being neither decomposed nor deteriorated. As a result, a resin processed article containing the flame retardant can exert high flame retardance even when the addition amount of the flame retardant is small. In addition, the bleed-out of the flame retardant can be prevented from occurring because the flame retardant can be sufficiently adsorbed by the powder.

A commercially available powder may be used as such hydrophilic silica powder. For example, a "SYLYSIA" (trade name, manufactured by FUJI SILYSIA CHEMICAL LTD.) or a "NIPGEL" (trade name, manufactured by TOSOH SILICA CORPORATION) can be used.

In addition, the content of the hydrophilic silica powder in the resin composition is preferably 2 to 12 mass %, or more preferably 2 to 6 mass %. When the content of the hydrophilic silica powder is less than 2 mass %, the powder cannot sufficiently adsorb the flame retardant, and it becomes difficult to disperse the flame retardant uniformly in the flame-retardant resin composition. As a result, a resin processed article containing the flame retardant may be unable to exert sufficient flame retardance.

In addition, the total content of the metal phosphinate represented by the above formula (I) and the reactive organophosphorus flame retardant in the resin composition is preferably 50 mass % or less, or more preferably 16 to 35 mass %.

In addition to the above inorganic fillers, the following inorganic fillers may be used in the present invention. Representative examples thereof include: metal powders of copper, iron, nickel, zinc, tin, stainless steel, aluminum, gold, silver, and the like; fumed silica; aluminum silicate; calcium silicate; silicic acid; water-containing calcium silicate; water-containing aluminum silicate; glass beads; carbon black; a quartz powder; isinglass; talc; mica; clay; titanium oxide; iron oxide; zinc oxide; calcium carbonate; magnesium carbonate; magnesium oxide; calcium oxide; magnesium sulfate; potassium titanate; and diatomaceous earth. The content of those inorganic fillers is preferably 1 to 45 mass %, or more preferably 1 to 20 mass % with respect to the entirety of the flame-retardant resin processed article. A content of the inorganic filler of less than 1 mass % is not preferable because the mechanical strength of the flame-retardant resin processed article is deficient, and the dimensional stability of the article is insufficient, and further, the absorption of the reactive flame retardant is not preferably sufficient. In addition, a content of the inorganic filler in excess of 45 mass % is not preferable because the flame-retardant resin processed article becomes brittle.

Of those inorganic fillers, a laminar clay, which is composed of silicate layers laminated, is particularly preferably used as the inorganic filler. The term "a laminar clay which is composed of silicate layers laminated" refers to a clay having a structure in which silicate layers each having a thickness of about 1 nm and a length of one side of about 100 nm are laminated. Accordingly, the laminar clay is dispersed into the resin in a nano order to form a hybrid structure with the resin. As a result, the heat resistance, mechanical strength, and the like to be obtained for the flame-retardant resin processed article are improved. The average particle size of the laminar clay is preferably 100 nm or less.

Examples of the laminar clay include montmorillonite, kaolinite, and mica. Of those, montmorillonite is preferable because of its excellent dispersibility. The surface of the laminar clay may be treated for improving dispersibility into a resin. Such laminar clay may be a commercially available one, and, for example, "Nanomer" (trade name, manufactured by NISSHOIWAI BENTONITE) or "Somasif" (trade name, manufactured by Co-op Chemical) can be used.

When the flame-retardant resin processed article contains laminar clay, the content of the laminar clay is preferable to be 1 to 8 mass % with respect to the entirety of the flame-retardant resin processed article. It should be noted that the laminar clay may be used alone, or may be used in combination with any other inorganic filler.

The incorporation of the reinforced fibers can improve the mechanical strength and dimensional stability of, for example, a molded article. Examples of the reinforced fibers include glass fibers, carbon fibers, and metal fibers. Glass fibers are preferably used in terms of strength and adhesiveness with the resin or with the inorganic filler. One kind of reinforced fiber may be used alone, or two or more kinds of fibers may be used in combination. The fibers may be treated with a conventionally known surface treatment agent such as a silane coupling agent.

Further, a surface-treated glass fiber is particularly preferably used as the above-mentioned reinforced fiber, and the fiber is more preferably coated with a resin. In this case, adhesiveness with a thermoplastic polymer can be additionally improved.

A conventionally known silane coupling agent can be used as the surface treatment agent, and specific examples thereof include silane coupling agents each having at least one alkoxy group selected from the group consisting of a methoxy group and an ethoxy group and at least one reactive functional group selected from the group consisting of an amino group, a vinyl group, an acrylic group, a methacrylic group, an epoxy group, a mercapto group, a halogen atom, and an isocyanate group.

In addition, the resin to be used for coating is not particularly limited, and examples thereof include a urethane resin and an epoxy resin.

The content of the reinforced fibers is preferably 5 to 50 mass %, or more preferably 10 to 40 mass % with respect to the entirety of the flame-retardant resin processed article. A content of less than 5 mass % is not preferable because the mechanical strength of the flame-retardant resin processed article reduces and the dimensional stability thereof becomes insufficient. A content in excess of 50 mass % is not preferable either because it becomes difficult to process the resin.

It should be noted that the resin composition to be used in the present invention may be added with any one of common various addition components except those described above such as a crystal nucleating agent, a colorant, an antioxidant, a release agent, a plasticizer, a heat stabilizer, a lubricant, and a UV inhibitor to the extent that physical properties such as heat resistance, weatherability, and impact resistance as objects of the present invention are not significantly impaired. In addition, as described later, a UV initiator or the like can be used when the resin and the reactive flame retardant are allowed to react with each other due to ultraviolet light.

The colorant is not particularly limited, but is preferably one that does not show color fading when irradiated with a radiation to be described later. For example, an inorganic pigment such as blood red, iron black, carbon, or chrome yellow, or a metal complex such as phthalocyanine is preferably used.

The flame-retardant resin processed article of the present invention is obtained by molding or film-coating the resin composition and then reacting the resin by heating or irradiation with a radiation with the reactive flame retardant.

The resin composition is molded by using a conventionally known method. For example, in the case of a resin composition containing a thermoplastic resin, the thermoplastic resin and a reactive flame retardant are melted and kneaded to produce a pellet. Then, the pellet can be molded by using a conventionally known method such as injection molding, extrusion molding, vacuum molding, or inflation molding. The melding and kneading can be performed using a general melting and kneading processing machine such as a mono-axial or biaxial extruder, a Banbury mixer, a kneader, or a mixing roll. A kneading temperature can be appropriately selected depending on the kind of the thermoplastic resin. For example, in the case of a polyamide-based resin, the kneading is preferably performed at 240 to 280° C. Molding conditions can be appropriately set and are not particularly limited. At this stage, crosslinking does not advance at all, so an extra spool portion at the time of molding can be recycled as a thermoplastic resin.

On the other hand, in the case of a thermosetting resin, as in the case of the above, the thermosetting resin and a reactive flame retardant are melted and kneaded to produce a pellet. Then, the pellet can be molded by using, for example, a conventionally known method such as injection molding, compression molding, or transfer molding.

In the case of preparing a coating film, the resin composition may be applied as it is. Alternatively, the resin composition may be appropriately diluted with a solvent or the like to prepare a solution or suspension that can be applied, and the solution or suspension may be dried by using a conventionally known method to prepare a coating film. A coating method such as roller coating, spraying, immersion, or spin coating can be used for preparing a coating film, and a method to be used is not particularly limited.

In the resin composition, a terminal unsaturated bond of the reactive flame retardant reacts with the resin to prompt a crosslinking reaction as a result of heating or irradiation with a radiation, so the bond is stably present in the resin.

When heating is employed as means for reacting the reactive flame retardant and the resin, the resin and the reactive flame retardant are reacted at a temperature higher than the temperature at which the resin is molded by preferably 5° C. or higher, or more preferably 10° C. or higher.

When a radiation is used as means for crosslinking, an electron beam, an α ray, a γ ray, an X-ray, ultraviolet light, or the like can be used. The term "radiation" used in the present invention refers to a radiation in a broad sense, and specifically includes an electromagnetic wave such as an X-ray or ultraviolet light in addition to a particle beam such as an electron beam or an α ray.

The irradiation is preferably performed with an electron beam or a γ ray out of the foregoing. A conventionally known electron accelerator or the like can be used for irradiation with an electron beam, and an accelerating energy of 2.5 MeV or more is preferable. Irradiation equipment using a conventionally known cobalt 60 radiation source or the like can be used for irradiation with a γ ray.

Irradiation equipment using a conventionally known cobalt 60 radiation source or the like can be used for irradiation with a γ ray. A γ ray is preferable because it has stronger permeability than that of an electron beam, so irradiation can be performed uniformly. However, the γ ray has strong radiation intensity, so the dose of the ray must be controlled in order to prevent excessive irradiation.

The irradiation dose of a radiation is preferably 10 kGy or more, or more preferably 10 to 45 kGy. An irradiation dose in this range provides a resin processed article excellent in the above-mentioned physical properties owing to crosslinking. An irradiation dose of less than 10 kGy is not preferable because the formation of a three-dimensional network structure due to crosslinking may be nonuniform and an unreacted crosslinking agent may bleed out. An irradiation dose larger than 45 kGy is not preferable either because the internal strain of the resin processed article due to an oxidation decomposition product remains to cause deformation, contraction, and the like.

The flame-retardant resin processed article of the present invention thus produced is excellent in mechanical characteristics, electrical characteristics, dimensional stability, and moldability in addition to heat resistance and flame retardance. Therefore, the resin processed article can be suitably used for an electrical or electronic component in which high levels of heat resistance and flame retardance are required, and for an automobile part or an optical part such as: a member for supporting a contact of an electromagnetic switch, a breaker, or the like; a substrate such as a printed board; a package for an integrated circuit; or a housing for an electrical component.

Specific examples of such electrical or electronic component include: a receiving board; a distribution board; an electromagnetic switch; a breaker; a transformer; an electromagnetic contactor; a circuit protector; a relay; a transformer; various sensors; various motors; and semiconductor devices such as a diode, a transistor, and an integrated circuit.

The resin processed article can be suitably used for an automobile part such as: a cooling fan; a bumper; a brake cover; an interior part such as a panel; a sliding part; a sensor; or a motor.

The resin processed article can be used not only as a molded article but also as a flame-retardant coating film for the molded article, a fiber, or the like.

In addition, excellent heat resistance and excellent flame retardance can be imparted when the resin processed article is used for, for example, sealing, covering, and insulating the above-mentioned electronic or electrical component such as a semiconductor device. That is, for example, the resin composition is sealed to cure the resin, and the above-mentioned reaction by heating or irradiation with a radiation is performed, whereby the resin processed article can be used as a flame-retardant sealing compound for sealing an electronic component or an electrical element such as a semiconductor chip or a ceramic capacitor. Sealing can be performed by casting, potting, transfer molding, injection molding, compression molding, or the like. An electronic or electrical component to be sealed is not particularly limited, and examples thereof include a liquid crystal, an integrated circuit, a transistor, a thyristor, a diode, and a capacitor.

EXAMPLES

Hereinafter, the present invention will be described in more detail by way of examples. However, the present invention is not limited to the examples.

Example 1

55.5 parts by mass of Nylon-66 (manufactured by Ube Industries, Ltd.: 2020B) as a thermoplastic resin, 25 parts by mass of glass fiber each having a surface treated with a silane coupling agent and each having a fiber length of about 3 mm (manufactured by ASAHI FIBER GLASS Co., Ltd.: 03.JAFT2Ak25) as reinforced fibers, 0.2 part by mass of carbon black as a colorant, 0.3 part by mass of antioxidant (manufactured by Chiba Specialty Chemicals Co., Ltd.: Irganox 1010), 5 parts by mass of talc having a particle diameter of 2 μm as an inorganic filler, 10 parts by mass of the compound of the formula (I-2) above as a metal phosphinate, and 4 parts by mass of the compound of the formula (II-3) above as a reactive organophosphorus flame retardant were compounded and kneaded in a side-flow type biaxial extruder (manufactured by The Japan Steel Works, LTD.) at 280° C. to obtain resin pellets. The pellets were dried at 115° C. for 4 hours and then molded using an injection molding machine (manufactured by FUNUC Corporation: α50C) under conditions of a resin temperature of 280° C. and a mold temperature of 80° C. This was irradiated with γ-ray at a dose of 25 kGy from a cobalt 60 source to obtain a resin processed article of Example 1.

Example 2

A resin processed article of Example 2 was obtained in the same manner as that in Example 1 except that in Example 1, the compounding amount of Nylon-66 (manufactured by Ube Industries, Ltd.: 2020B) as a thermoplastic resin was changed to 51.5 parts by mass, and 4 parts by mass of nano-particle size clay (manufactured by Volclay Japan, Co.: Nanomer I30T) was newly compounded.

Example 3

A resin processed article of Example 3 was obtained in the same manner as that in Example 1 except that in Example 1, the compounding amount of Nylon-66 (manufactured by Ube Industries, Ltd.: 2020B) as a thermoplastic resin was changed to 51.5 parts by mass, 10 parts by mass of the compound of the formula (I-5) instead of the compound of the formula (I-2) was compounded as the metal phosphinate, 4 parts by mass of the compound of the formula (II-1) instead of the compound of the formula (II-3) was compounded as the reactive organophosphorus flame retardant, and 4 parts by mass of an organophosphorus-based flame retardant represented by the structural formula (A) below was newly compounded.

[Chem 14]

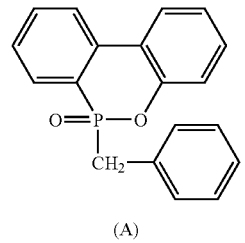

(A)

Example 4

A resin processed article of Example 4 was obtained in the same manner as that in Example 1 except that in Example 1, the compounding amount of Nylon-66 (manufactured by Ube Industries, Ltd.: 2020B) as a thermoplastic resin was changed to 53.5 parts by mass, 10 parts by mass of the compound of the formula (I-10) instead of the compound of the formula (I-2) was compounded as the metal phosphinate, 4 parts by mass of the compound of the formula (II-4) instead of the compound of the formula (II-3) was compounded as the reactive organophosphorus flame retardant, and 2 parts by mass of a cyclic nitrogen-containing compound having at least one unsaturated group at an end thereof (manufactured by Nippon Kasei Chemical Co., Ltd.: TAIC) was newly compounded.

Example 5

A resin processed article of Example 5 was obtained in the same manner as that in Example 4 except that in Example 4, 10 parts by mass of the compound of the formula (I-12) instead of the compound of the formula (I-10) was compounded as the metal phosphinate, and 4 parts by mass of the compound of the formula (II-20) instead of the compound of the formula (II-4) was compounded as the reactive organophosphorus flame retardant.

Example 6

A resin processed article of Example 6 was obtained in the same manner as that in Example 2 except that in Example 2, the compounding amount of Nylon-66 (manufactured by Ube Industries, Ltd.: 2020B) as a thermoplastic resin was changed to 41.5 parts by mass, and 10 parts by mass of fine powder-state synthetic silica having an oil absorption of 170 ml/100 g, and a pH of 7.0 (manufactured by Fuji Silysia Chemical Ltd: Silysia530) was newly compounded.

Example 7

55.5 parts by mass of Nylon-66 (manufactured by Ube Industries, Ltd.: 2020B) as a thermoplastic resin, 25 parts by mass of glass fiber each having a surface treated with a silane coupling agent and each having a fiber length of about 3 mm (manufactured by ASAHI FIBER GLASS Co., Ltd.: 03.JAFT2Ak25) as reinforced fibers, 0.2 part by mass of carbon black as a colorant, 0.3 part by mass of antioxidant (manufactured by Chiba Specialty Chemicals Co., Ltd.: Irganox 1010), 5 parts by mass of talc having a particle diameter of 2 μm as an inorganic filler, 10 parts by mass of the compound of the formula (I-10) above as a metal phosphinate, and 4 parts by mass of the compound of the formula (II-1) above as a reactive organophosphorus flame retardant were compounded and kneaded in a side-flow type biaxial extruder (manufactured by The Japan Steel Works, LTD.) at 280° C. to obtain resin pellets. The pellets were dried at 115° C. for 4 hours and then molded using an injection molding machine (manufactured by FUNUC Corporation: α50C) under conditions of a resin temperature of 280° C. and a mold temperature of 80° C. to obtain a resin processed article of Example 7.

Example 8

A resin processed article of Example 8 was obtained in the same manner as that in Example 1 except that in Example 1, 49.5 parts by mass of Nylon-6T (manufactured by Toyobo Co., Ltd.: TY-502NZ) instead of Nylon-66 (manufactured by Ube Industries, Ltd.: 2020B) was compounded as the thermoplastic resin, 10 parts by mass of the compound of the formula (I-22) instead of the compound of the formula (I-2) was compounded as the metal phosphinate, 4 parts by mass of the compound of the formula (II-4) instead of the compound of the formula (II-3) was compounded as the reactive organophosphorus flame retardant was compounded, and 4 parts by mass of nano-particle size clay (manufactured by Volclay Japan, Co.: Nanomer I30T), and 2 parts by mass of a cyclic nitrogen-containing compound having at least one unsaturated group at an end thereof (manufactured by Nippon Kasei Chemical Co., Ltd.: TAIC) were newly compounded.

Comparative Example 1

A resin processed article of Comparative Example 1 was obtained in the same manner as that in Example 1 except that in Example 1, no reactive organophosphorus flame retardant was added.

Comparative Example 2

A resin processed article of Comparative Example 2 was obtained in the same manner as that in Example 1 except that in Example 1, magnesium hydroxide instead of the metal phosphinate was used.

Comparative Example 3

A resin processed article of Comparative Example 3 was obtained in the same manner as that in Example 1 except that in Example 1, a non-reactive organophosphorus-based flame retardant (manufactured by Sanko Chemical Industry Co., Ltd.: HCA-HQ) instead of the reactive organophosphorus flame retardant was used.

Comparative Example 4

A resin processed article of Comparative Example 4 was obtained in the same manner as that in Example 3 except that in Example 3, a non-reactive organophosphorus-based flame retardant (manufactured by Sanko Chemical Industry Co., Ltd.: HCA-HQ) instead of the reactive organophosphorus flame retardant was used, and magnesium hydroxide instead of the organophosphorus-based flame retardant represented by the structural formula (A) was used.

Comparative Example 5

A resin processed article of Comparative Example 5 was obtained in the same manner as that in Example 6 except that in Example 6, a non-reactive organophosphorus-based flame retardant (manufactured by Shikoku Chemicals Corporation: SP-703) instead of the reactive organophosphorus flame retardant was used, and calcium carbonate having an oil adsorption of 15 ml/100 g and a pH of 8.5 to 9.5 (manufactured by Nitto Funka Kogyo K.K.: NS#400) was used as an inorganic filler.

Comparative Example 6

A resin processed article of Comparative Example 6 was obtained in the same manner as that in Example 6 except that in Example 6, a non-reactive organophosphorus-based flame retardant (manufactured by Sanko Chemical Industry Co., Ltd: BCA) instead of the reactive organophosphorus flame retardant was used, and fine powder-state synthetic silica having an oil adsorption of 300 ml/100 g and a pH of 2.5 (manufactured by Fuji Silysia Chemical Ltd Silysia250) was used as an inorganic filler.

Test Example

For each of the resin processed articles of Examples 1 to 8 and Comparative Examples 1 to 6, a test piece (measuring 5 inches long by ½ inch wide by 3.2 mm thick) in conformance with UL-94 as a flame retardance test and a glow-wire test piece (60 mm square, having a thickness of 1.6 mm) in conformance with an IEC60695-2 method (GWFI) were created, and the test pieces were subjected to a UL 94 test, and a glow-wire test (in conformance with IEC). In addition, all the resin processed articles were subjected to a bleed-out test. Table 1 shows the results.

In the UL 94 test, a test piece was vertically mounted and heated while being in contact with the flame of a Bunsen burner for 10 seconds to record a burning time. After the flame had been extinguished, the test piece was heated while being in contact with the flame for 10 seconds again to record a burning time. The total of the burning times, a glowing time after the second extinguishment, and the presence or absence of a dropped product for igniting cotton were used for determination.

In addition, the glow-wire test was performed by using a nichrome wire of 4 mm in diameter (composed of 80% of nickel and 20% of chromium) bent to prevent its tip from splitting as a glow-wire and a type K (Chromel-Alumel) of 0.5 mm in diameter as a thermocouple for measuring a temperature at a thermocouple pressing load of 1.0±0.2 N and a temperature of 850° C. A burning time of 30 seconds or less after contact for 30 seconds and the failure of tissue paper below a sample to ignite were used as determination criteria of combustibility (GWFI).

In addition, a bleed-out test was performed as described below. A test body was stored under conditions including a temperature of 60° C. and a humidity of 95% for 96 hours. The surface of the test body after the storage was evaluated for presence or absence of bleeding through visual observation.

TABLE 1

| | Flame retardancy (UL-94) | Kindler to reach clamp | Ignition of absorbent cotton due to dropped product | Glow-wire test | Bleed-out test |
|---|---|---|---|---|---|
| Example 1 | V-0 | Absent | Absent | Passed | Absent |
| Example 2 | V-0 | Absent | Absent | Passed | Absent |
| Example 3 | V-0 | Absent | Absent | Passed | Absent |
| Example 4 | V-0 | Absent | Absent | Passed | Absent |
| Example 5 | V-0 | Absent | Absent | Passed | Absent |
| Example 6 | V-0 | Absent | Absent | Passed | Absent |
| Example 7 | V-0 | Absent | Absent | Passed | Absent |
| Example 8 | V-0 | Absent | Absent | Passed | Absent |
| Comparative Example 1 | HB | Present | Absent | Failed | Present |
| Comparative Example 2 | HB | Present | Present | Failed | Absent |
| Comparative Example 3 | V-2 | Absent | Present | Passed | Present |
| Comparative Example 4 | V-2 | Absent | Present | Passed | Present |
| Comparative Example 5 | HB | Present | Present | Failed | Present |
| Comparative Example 6 | HB | Present | Present | Failed | Absent |

As can be seen from the results of Table 1, the resin processed articles of Examples 1 to 8 each had good flame retardance of V-0 grade, and each passed the glow wire test. Further, none of the articles caused the bleeding of any flame retardant. On the other hand, the resin processed articles using no flame retardant containing both the reactive organophosphorus flame retardant and the metal phosphinate showed insufficient flame retardance. In each of Comparative Examples 1, 3, 4, and 5, there was a bleed-out occurred.

INDUSTRIAL APPLICABILITY

The present invention can be suitably used for resin molded articles such as an electrical component and an electronic component as a flame retardant resin processed article each containing no halogen.

The invention claimed is:

1. A flame-retardant resin processed article, comprising a resin composition comprising a flame retardant that comprises a metal phosphinate represented by the following formula (I), a reactive organophosphorus flame retardant having a terminal unsaturated group, and a resin, the resin composition being molded into a certain shape or formed into a coating film, wherein the total content of the metal phosphinate and the reactive organophosphorus flame retardant in the resin composition is from 5 to 30 mass %:

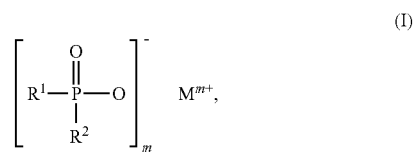

(I)

where $R^1$ and $R^2$ each independently represent an alkyl group having 1 to 6 carbon atoms or an aryl group having 12 or less carbon atoms; where M represents calcium, aluminum or zinc; and where m is 3, when M representing aluminum, and otherwise m is 2.

2. The flame-retardant resin processed article according to claim 1, wherein the resin composition comprises two or more kinds of the reactive organophosphorus flame retardants, and at least one kind of the reactive organophosphorus flame retardants comprises a polyfunctional reactive flame retardant.

3. The flame-retardant resin processed article according to claim 1, wherein the resin composition contains 5 mass % or more of the metal phosphinate and 0.5 mass % or more of the reactive organophosphorus flame retardant.

4. The flame-retardant resin processed article according to claim 1, wherein the resin composition further contains a flame retardant except the reactive organophosphorus flame retardant, the flame retardant comprising a cyclic nitrogen-containing compound having at least one terminal unsaturated group.

5. The flame-retardant resin processed article according to claim 1, wherein the resin composition further contains hydrophilic silica powder having an average particle diameter of 15 μm or less.

6. The flame-retardant resin processed article according to claim 5, wherein the hydrophilic silica powder comprises a porous structure having a pore volume of 1.8 ml/g or less and a pH of 4 to 7.

7. The flame-retardant resin processed article according to claim 5, wherein the hydrophilic silica powder has an oil absorption of 50 ml/100 g or more in accordance with JIS K5101.

8. The flame-retardant resin processed article according to claim 5, wherein the resin composition comprises 2 to 12 mass % of the hydrophilic silica powder.

9. The flame-retardant resin processed article according to claim 1, wherein the resin composition further comprises a crosslinking agent which is a polyfunctional monomer or oligomer having an unsaturated bond at a terminal end of main skeleton.

10. The flame-retardant resin processed article according to claim 1, further comprising 1 to 45 mass % of an inorganic filler with respect to the entirety of the flame-retardant resin processed article.

11. The flame-retardant resin processed article according to claim 10, further comprising 1 to 8 mass % of a laminar clay as the inorganic filler with respect to the entirety of the flame-retardant resin processed article, the laminar clay comprising laminated silicate layers.

12. The flame-retardant resin processed article according to claim 1, further comprising 5 to 50 mass % of reinforced fibers with respect to the entirety of the flame-retardant resin processed article.

13. The flame-retardant resin processed article according to claim 1, which is obtained by causing the resin and the reactive organophosphorus flame retardant to react with each other by irradiation with electron beams or γ rays at a dose of 10 kGy or more.

14. The flame-retardant resin processed article according to claim 1, which is obtained by causing the resin and the reactive organophosphorus flame retardant to react with each other at a temperature higher than a temperature at which the resin composition is molded by 5° C. or higher.

15. The flame-retardant resin processed article according to claim 1, which is one selected from the group consisting of a molded article, a coating film, and a sealing compound.

16. The flame-retardant resin processed article according to claim 1, which is used as an electrical component or an electronic component.

* * * * *